US010054511B2

(12) United States Patent
Sloetjes et al.

(10) Patent No.: US 10,054,511 B2
(45) Date of Patent: Aug. 21, 2018

(54) PRESSURE SENSOR WITH CORRECTION OF OFFSET DRIFT IN CYCLIC SIGNAL

(71) Applicant: Sensata Technologies, Inc., Attleboro, MA (US)

(72) Inventors: Jan-Willem Sloetjes, Wierden (NL); Serge Groenhuijzen, Borne (NL); Bart Jan Mathijs Salden, Heeten (NL)

(73) Assignee: Sensata Technologies, Inc., Attleboro, MA (US)

( * ) Notice: Subject to any disclaimer, the term of this patent is extended or adjusted under 35 U.S.C. 154(b) by 915 days.

(21) Appl. No.: 14/504,358

(22) Filed: Oct. 1, 2014

(65) Prior Publication Data
US 2016/0097693 A1   Apr. 7, 2016

(51) Int. Cl.
| G01L 23/10 | (2006.01) |
| G01L 27/00 | (2006.01) |
| G01L 19/02 | (2006.01) |
| G01D 3/032 | (2006.01) |

(52) U.S. Cl.
CPC ............ *G01L 27/002* (2013.01); *G01D 3/032* (2013.01); *G01L 19/02* (2013.01); *G01L 23/10* (2013.01)

(58) Field of Classification Search
CPC .............................. G01L 27/002; G01D 3/032
See application file for complete search history.

(56) References Cited

U.S. PATENT DOCUMENTS

| 7,913,536 | B2 | 3/2011 | Tiek et al. | |
| 2007/0220983 | A1* | 9/2007 | Sugino | G01L 9/0008 |
| | | | | 73/702 |
| 2009/0018746 | A1* | 1/2009 | Miller | F02D 35/023 |
| | | | | 701/102 |
| 2011/0264392 | A1 | 10/2011 | Raymond et al. | |
| 2012/0239336 | A1* | 9/2012 | Delache | G01F 15/024 |
| | | | | 702/100 |

FOREIGN PATENT DOCUMENTS

| WO | WO 2014/044352 A1 | 3/2014 | |
| WO | WO 2014044352 A1 * | 3/2014 | ............. G01L 23/08 |

OTHER PUBLICATIONS

European Search Report; EP 15 18 7606, dated Feb. 5, 2016, pp. 2.

* cited by examiner

*Primary Examiner* — Mohamed Charioui
(74) *Attorney, Agent, or Firm* — Burns & Levinson LLP; Joseph M. Maraia; George N. Chaclas

(57) ABSTRACT

A method for correcting offset drift in a sensor used in cyclic sensing is provided. The method includes: identifying a target value for a parameter of a signal between sensing cycles of the sensor; ascertaining a difference between a measured value for the signal and the target value; ascertaining a duration between the sensing cycles; using the difference and the duration, calculating a number of steps to attain the target value from the measured value; and adjusting the measured value by the number of steps to substantially agree with the target value. A pressure sensor is disclosed.

18 Claims, 3 Drawing Sheets

PRESSURE SENSOR WITH CORRECTION OF OFFSET DRIFT IN CYCLIC SIGNAL

BACKGROUND OF THE INVENTION

1. Field of the Invention

The present invention relates to a method of compensation for a cyclical input signal. In a further aspect, the invention relates to an arrangement for compensation of a cyclical input signal. The invention has particular application in engine control to compensate behavior changes of a sensor, such as offset and sensitivity, during operation of said sensor, due to for example ambient temperature changes.

2. Description of the Related Art

Pressure sensors are widely used in combustion systems. Given that pressure sensors are often used in harsh environments, techniques for data correction that take into account conditions of operation are often required.

Pressure sensors exhibit an offset voltage, which is the output voltage of a sensor when no pressure is applied. The output voltage will vary as a function of temperature (that is, has a certain "offset voltage temperature characteristic"). The offset voltage temperature characteristic defines the variation of the offset voltage with changes in ambient temperature of the sensor.

Modern engines could use closed loop combustion for several reasons like CO2 or emission reduction. The pressure inside the cylinder gives information about the timing, cleanliness and effectiveness of the combustion. With knowledge of the cylinder pressure NOx and particulate emissions, heat release and torque can be measured and controlled, it is very easy to determine combustion onset and other such parameters. Well known examples of combustion parameters are heat release points and indicated mean effective pressure (IMEP) values.

One method for compensating output of a pressure sensor for the variability arising during operation is provided in U.S. Pat. No. 7,913,536, entitled "Compensation Arrangement and Method for Operation thereof," the entire disclosure of which is incorporated herein in its entirety. While the techniques provided offer improvements over the prior art, it would be advantageous to account for drift in the signal from a pressure sensor where the cycles occur in a more rapid fashion.

What are needed are methods and apparatus to improve correction of pressure sensor offset drift.

SUMMARY OF THE INVENTION

In one embodiment, a method for correcting offset drift of a sensor used in cyclic sensing is provided. The method includes: identifying a target value for a parameter of a signal between sensing cycles of the sensor; ascertaining a difference between a measured value for the signal and the target value; ascertaining a duration between the sensing cycles; using the difference and the duration, calculating a number of steps to attain the target value from the measured value; and adjusting the measured value by the number of steps to substantially agree with the target value.

In another embodiment, a pressure sensor configured for use in cyclic sensing is provided. The sensor includes: at least one piezoresistive element configured for sensing pressure and outputting voltage; a circuit configured for receiving the output voltage of the element and identifying a target value for the voltage for between sensing cycles of the sensor; ascertaining a difference between an output value of the element and the target value; ascertaining a duration between the sensing cycles; using the difference and the duration, calculating a number of steps to attain the target value from the output value; and, adjusting the output by the number of steps to substantially agree with the target value; and providing the adjusted output as a corrected output of the sensor.

BRIEF DESCRIPTION OF THE DRAWINGS

The features and advantages of the invention are apparent from the following description taken in conjunction with the accompanying drawings in which.

DETAILED DESCRIPTION OF THE INVENTION

Disclosed herein techniques for correcting output of a pressure sensor deployed in a cyclic environment. Advantageously, the techniques provide for accurate pressure measurement data in environments where variability of ambient temperature impacts data reliability. In particular, the techniques provide for real time correction of data collected at a high frequency.

In certain applications, output of a pressure sensor (which is the input signal to an ASIC) is subject to offset drift, caused by thermal and/or mechanical stress. Despite the offset, the baseline value of the output should be kept at a specific level (that is, drift from external stress should be disregarded, if possible). Given the dynamic nature of many implementations, adjustment for offset drift requires an active compensation of the signal. This compensation of the thermal and/or mechanical stress is called Dynamic Offset Compensation, or "DOC."

Generally, the techniques disclosed herein involve techniques for characterizing output of a pressure sensor, calculating dynamic offset compensation (DOC) for that output, and implementing dynamic offset compensation (DOC) to correct output of the pressure sensor.

As discussed herein, the term "cyclic" generally refers to an environment where conditions change on a repetitive basis. In the exemplary embodiment, the sampling environment is a combustion chamber of an internal combustion engine. In this embodiment, increasing revolutions-per-minute (RPM) of the internal combustion engine causes a decrease in the cycle time. Additionally, sustained operation at high speeds or low speeds can lead to substantially different operating temperatures. Accordingly, during any given cycle, or series of cycles, temperature of the environment may be increasing, decreasing, or remaining relatively stable with minor fluctuations.

As discussed herein, the terms "offset drift," "offset," "drift" and other related terms generally refers to a deviation in output from a calibrated condition or a desired output for any given parameter. It is anticipated that drift may be predictable. The offset drift may be predictable (for example, deviation as a function of temperature). Whether predictable or not, it is generally desirable to substantially eliminate the deviation in order to normalize output data for the given parameter.

Generally, as discussed herein and in the context of a cyclic signal, the term "signal" refers to input signals, output signals, and any part of the signal chain where application of the techniques provided will result in a desired result.

Figure 1:
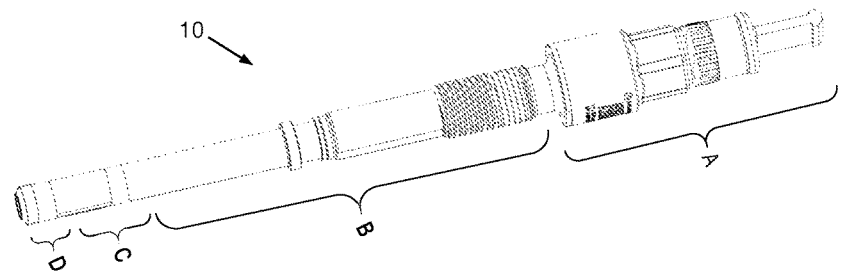
FIG. 1 is an isometric diagram depicting aspects of an exemplary pressure sensor useful for measuring pressure in a cyclic environment.

Referring now to FIG. 1, there is shown an exemplary pressure sensor 10. For purposes of discussion herein, the exemplary pressure sensor is divided into four regions. Each region generally experiences a differing temperature then neighboring regions. For example, where the pressure sensor 10 is used in an internal combustion engine, Region A generally provides for external connections, and generally experiences lower temperatures than other portions of the pressure sensor 10. Region A may be exposed to, for example, an engine compartment. Region B generally provides for mounting of the pressure sensor 10. Region B may be exposed to, for example, a cylinder head, or engine block. Region C generally represents a transition area between Region B (where the pressure sensor may be mounted) and a sensing environment (Region D). Region D may reside in an environment where sensing is required. Region D may be exposed to, for example, a combustion chamber of the internal combustion engine.

In the exemplary pressure sensor, monocrystalline silica strain gauges (MSG) are used as sensing elements. The temperature dependency of these elements can be very large and there are manufacturing variations in the MSG sensing elements. Accordingly, a calibration procedure may be adopted in the manufacturing process, in which a number of parameters will be written to nonvolatile memory associated with the pressure sensor 10.

As one may surmise, when the pressure sensor 10 is used in an internal combustion engine, it is subjected to substantial stress. Such stress may be realized as a result of the foregoing temperatures and temperature gradients. Stress may also be realized as a result of mechanical stress, such as from vibration and combustion detonation.

Generally, the strain gauges are connected to form a Wheatstone bridge circuit to increase output of the pressure sensor 10 and to reduce sensitivity to errors. An exemplary electrical schematic is provided in FIG. 7, and discussed further herein.

Figure 2:
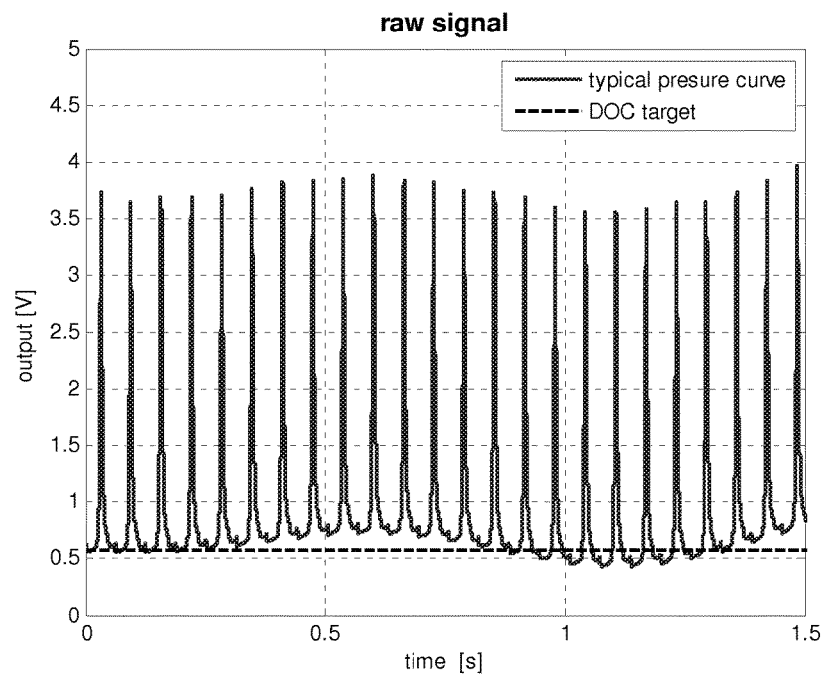
FIG. 2 is graph depicting uncorrected output of the pressure sensor of FIG. 1, wherein output voltage is shown as a function of time (in arbitrary units)

Referring now to FIG. 2, there is shown exemplary, uncorrected (raw) data from the pressure sensor 10. The data reflect the repetitive nature of the combustion cycle. That is, during compression, output voltage of the pressure sensor 10 rapidly increases. Following combustion, output voltage of the pressure sensor 10 rapidly decreases. In an environment with only nominal pressure (i.e., at the bottom of the combustion cycle), the pressure sensor 10 should produce an output voltage that is shown as the "target" voltage (i.e., an ideal voltage that is generally correlated with problem free operation). In broad terms, the "baseline" value is the value of the output voltage after each combustion pressure cycle. As may be seen, the "baseline" voltage, or the true output voltage of the pressure sensor 10 may somewhat higher or lower than the target voltage. This disparity is a result of various factors, predominantly the temperature and mechanical stress influencing the sensing elements.

Figure 3:
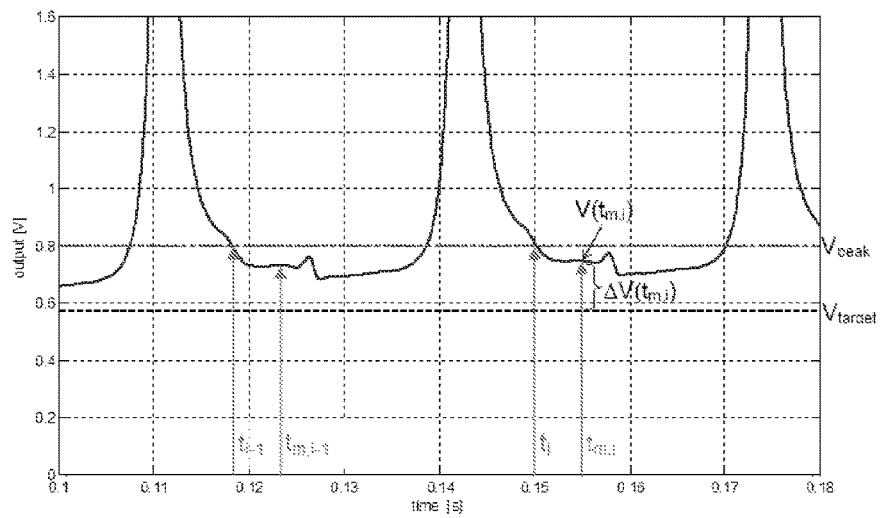
FIG. 3 is an exploded view of the graph of FIG. 2, wherein output is shown as a function of time (in seconds)

Refer now to FIG. 3, which provides an exploded view of a portion of the curve shown in FIG. 2. An algorithm for Dynamic Offset Correction (DOC) of the baseline voltage that is in accord with the teachings herein, starts with the assumption that the duration of two consecutive cycles does not vary much. That is, the cycle time of one cycle is a good approximation of the cycle time of the next cycle (i.e., the duration of a given cycle may be estimated by referencing the duration of the prior cycle). As a matter of convention, the time between two consecutive peak detection crossings $(t_i - t_{i-1})$ is used for estimation of the cycle time (in this case, revolutions per minute, RPM). The sampling moment for the correction $(t_{m,i})$ may be chosen as a percentage of this time $(t_i - t_{i-1})$, after the latest crossing $t_i$, or at a fixed time after $t_i$. This may be used to ensure that the output value $V(t_{m,i})$ is always in the low pressure region, or at minimal pressure (generally denoted by, "m"). FIG. 3 shows the trigger moments for combustion pressure signals. In embodiments herein, the sampling moment for DOC is given as a percentage of time after the crossing the latest peak $(t_i)$.

For combustion pressure signals, in some embodiments, cycle time based timing may be based on an event triggered by the ECU and picked up by the pressure sensor 10. Such an event could take place at a moment corresponding to a fixed crank-angle position. Advantageously, the fixed crank-angle position is an objective parameter that is not affected by aspects such as temperature, drift or varying rpm and is easily obtained.

In embodiments provided herein, dynamic offset correction (DOC) is based on linear adjustment. In a digital implementation, dynamic offset correction (DOC) can be realized by adjusting the output voltage continuously with small steps, $V_{DOCstep}$, in the output voltage. Generally, the size of the steps, $V_{DOCstep}$, is chosen to be sufficiently small to ensure a substantially linear behavior. In other words, the step size is small enough such that each step cannot be distinguished from the typical noise-level of the output voltage signal. The slope may be determined in an adaptive way so that the corrected output moves actively towards a predefined reference level ($v_{target}$), or ideal voltage. The slope of the correction is realized by varying the time between two small steps and the direction of the small steps (ascending, $+\Delta V$, or descending, $-\Delta V$).

The size of the steps, $V_{DOCstep}$, may be predetermined and may vary according to conditions. For example, the size of the steps, $V_{DOCstep}$, may be provided in a data table that correlates the size of the steps, $V_{DOCstep}$, to RPM of the engine. Alternatively, the size of the steps, $V_{DOCstep}$, may be provided as a function that correlates the size of the steps, $V_{DOCstep}$, to RPM of the engine. In short, a variety of techniques for determining and supplying the size of the steps, $V_{DOCstep}$, may be realized. Generally, the size of the steps, $V_{DOCstep}$, is provided as a parameter that is stored in memory, such as on board an application specific integrated circuit (ASIC) used to implement dynamic offset correction (DOC).

In this embodiment, offset drift is the difference, $\Delta V$, between the target voltage, $V_{DOCtarget}$, and the output voltage, $V_{tm,i}$, measured at time, $t_{m,i}$, may be calculated according to Eq. (1):

$$\Delta V = V_{DOCtarget} - V_{tm,i} \qquad \text{Eq. (1).}$$

The number of steps, nr.steps, needed to attain the target voltage, $V_{DOCtarget}$, may be calculated with the parameter, $V_{DOCstep}$, as provided in Eq. (2):

$$nr.\text{steps} = |\Delta V / V_{DOCstep}| \qquad \text{Eq. (2).}$$

The duration of a single step, $dt_{final}$, may be determined according to Eq. (3):

$$dt_{final} = (t_i - t_{i-1}) - /(nr.\text{steps})\qquad\text{Eq. (3)};$$

The sign of $\Delta V$ determines the direction of the small step (negative or positive).

In another embodiment, a feedback control loop, for instance a Proportional-Integral-Derivative (PID) control loop, makes use of the previous slope values to optimize the correction steps.

Figure 4:
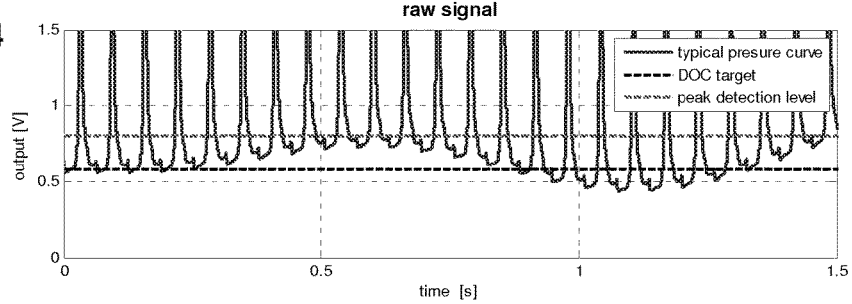
FIG. 4 is another graph depicting exemplary output for the pressure sensor.
Figure 5:
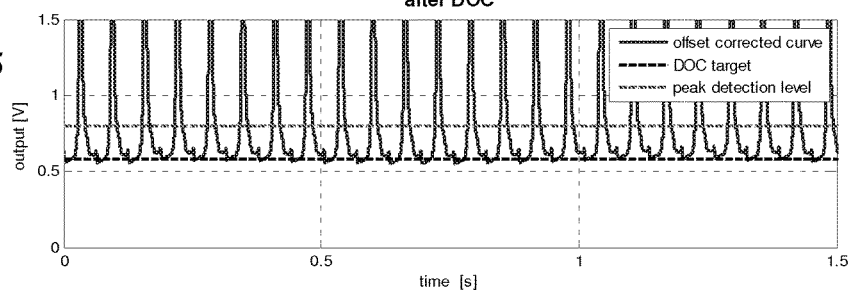
FIG. 5 is graph depicting exemplary corrected output for output depicted in FIG. 4; and, FIG. 6 is a graph depicting output voltage for the pressure sensor as a function of an external triggering event.

Refer now to FIGS. 4 and 5 where results of simulations are depicted. FIG. 4 provides a typical (uncorrected) output voltage curve, while FIG. 5 depicts a corrected curve for the same data set. As may be seen in the graphs, the data in FIG. 4 trend above the target output, while the data in FIG. 5 closely follow the target output voltage level.

When the Dynamic Offset Correction (DOC) is enabled, there is no need for temperature compensation of the offset of the sensing element and this offset compensation over temperature may be switched off. The update of the temperature correction for the gain-error of the sensing element may continue and an update of the correction value may be applied just after the trigger moment, $t_{m,i}$.

Dynamic Offset Correction (DOC) may be enabled or disabled at the circuit level. If a circuit for Dynamic Offset Correction (DOC) is enabled, the circuit will automatically compensate for the offset in the output of the pressure sensor such that the baseline of the output is substantially in conformity with a specified target voltage. In some embodiments, if the circuit is disabled, the input offset shall only be compensated for the offset of the MSG sensing element.

The DOC circuit can be triggered by automatic detection of the combustion pulses. This is referred to as "internal triggering." In addition to internal triggering, the DOC can also be "externally triggered." External triggering may occur, for example, via a shorted output-pin which causes recognition of triggering input.

Figure 6:
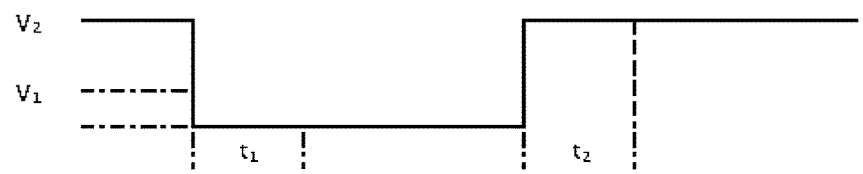

An exemplary pulse for external triggering is provided in FIG. 6. In this example, if the output is forced to a level below $V_1$ for a certain time, this is recognized as an external trigger-pulse. When the short circuit of the output is removed, the DOC shall take a sample within a certain time and use the sampled level to compensate the output in one step. Exemplary parameters for implementing this logic are provided in Table 2.

TABLE 2

Exemplary External Trigger Parameters

| PARAMETER | DESCRIPTION |
|---|---|
| $V_1$ | Threshold level |
| $V_2$ | Normal output voltage. No min/max specified |
| $t_1$ | Minimum wait time to flag external DOC request |
| $t_2$ | Wait time to execute DOC step |

With a combination of internal triggering and external triggering, it is possible to select a variety of modes in the application were the sensor will be used. Exemplary modes for operation are provided in Table 3.

TABLE 3

Operational Modes

| MODE | SENSOR START-UP | NORMAL OPERATION |
|---|---|---|
| 0 | disable DOC | disable DOC |
| 1 | external | external |
| 2 | internal | internal |
| 3 | internal | external |
| 4 | external | internal |

As presented in Table 3, "sensor start-up" refers to booting of the pressure sensor 10 at the moment before the engine is started-up. "Normal Operation" refers to operation of the pressure sensor 10 with a running engine and combustion pulses that cross the peak detection level ($V_{peakdet}$) are present.

When the ASIC starts up, there may not be immediately pulses present. In the case of ASIC start up or reboot, the offset shall be compensated within a limited amount of time defined by the parameter $t_{DOC\_start\_up}$. Within this amount of time the, the output will reach the output level within the accuracy limits.

In cases where there are no combustions pulses being detected, the ASIC will enter a time-out mode. This mode can be described as performing a DOC correction loop after a certain amount of time, where this time is programmable in the non-volatile memory of the ASIC. The threshold for entering the timeout mode may be a constant amount of time or a certain percentage of the last monitored cycle time. Once in the timeout mode, the frequency of performing the DOC correction loop can also be determined by a constant amount of time or a certain percentage of the last monitored cycle time.

Figure 7:
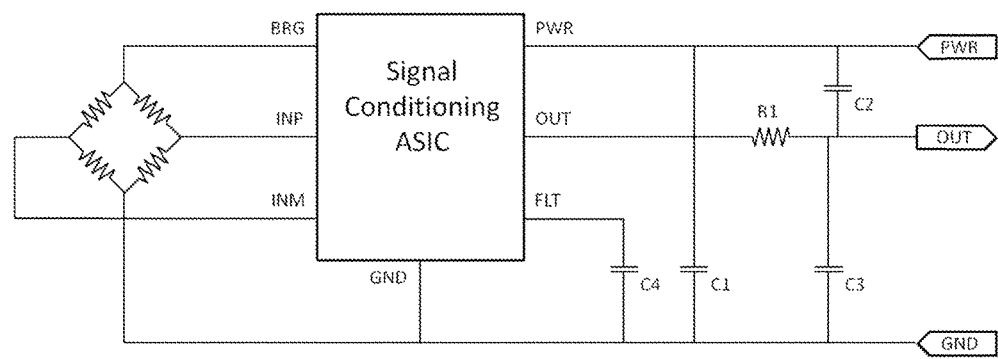
FIG. 7 is a schematic diagram depicting an exemplary circuit for correcting output of the pressure sensor.

FIG. 7 depicts an exemplary schematic diagram for the pressure sensor and accompanying ASIC. In general, the ASIC will convert small changes in piezo-resistors, connected in a full Wheatstone configuration, to large changes in output voltage. The output is ratio metric and is a percentage of the supply voltage. Note that the schematic shown is for a typical application and does not reflect the variety of applications that the ASIC may support.

In the exemplary embodiment a decoupling capacitor (C1) may be disposed between the power supply (PWR) and ground (GND). EMC capacitors (C2 and C3) may be incorporated to enhance immunity against external electrical disturbances. A filter capacitor (C4) may be used in combination with an internal fixed resistor as a first order RC filter for the output stage. Generally, the RC filter provides for limiting noise in measurements of the output voltage (OUT). The small low-ohmic series resistor R1 in the output line improves the EMC performance of the sensor.

Having introduced techniques for correcting offset drift in cyclic signals, some additional aspects are presented.

The techniques are not limited to use with pressure sensors. The techniques disclosed may be used to correct data from any type of sensor that suffers drift during cyclic sensing of conditions. Exemplary other types of sensors include force sensors, torque sensors, positioning sensors (such as those configured for linear or angular measurements), speed sensors (such as those configured for linear or angular measurements), acceleration (such as those configured for linear or angular measurements), chemical sensors (such as those configured for soot, NOx and a myriad of other substances), temperature sensors, airflow sensors, conductivity sensors, alkalinity sensors and other such types of sensors.

Accordingly, a "target value" may be identified for a respective type of sensor. In the embodiments provided herein, the target value is the target voltage. However, the target value may be chosen for any parameter that is considered meaningful. Exemplary parameters include current, voltage, frequency, optical output and any other type of sensor output deemed applicable.

Sensing techniques may make use of any one or more of a variety of technologies. For example, sensing techniques may make use of piezoresistive, piezoelectric, micro-electro-mechanical systems (mems), capacitive, and magnetic (Hall) effect sensing, as well as others.

Sensor output may include, for example, analog output and/or digital output. Exemplary analog output includes voltage, current, and pulse width modulation (PWM/Frequency). Exemplary digital output includes, for example, LIN, SENT, I2C, and CAN-bus outputs.

Further, other components may be included and called upon for providing for aspects of the teachings herein. For example, additional electronic components as well as software, combinations of electronic components as well as software and/or omission thereof may be used to provide for added embodiments that are within the scope of the teachings herein.

As discussed herein, the term "software" generally refers to an instruction set provided as machine executable instructions provided as a non-transitory signal, such as stored on machine readable media. Generally, the software may provide for at least one of the dynamic offset correction calculations, data storage, adjustments to output, control of triggering and other such functions. As discussed herein, the "software" may be downloaded to the pressure sensor (i.e., written to the ASIC), stored in the ASIC, or otherwise reside in the ASIC. For example, the software may be provided in read only memory (ROM) in a manner commonly referred to as "firmware."

As discussed herein, "dynamic offset correction" generally refers to reducing or substantially reducing the influence of external stress on output of the sensing element. For example, substantially eliminating influence results in reductions of output drift to levels that are within acceptability for a particular design, or from the perspective of a designer, manufacturer, user, or other similarly interested person. Alternatively, substantially eliminating influence of external charge results in reductions of output drift to levels that exceed the performance of competitive designs (or both).

Various other components may be included and called upon for providing for aspects of the teachings herein. For example, additional materials, combinations of materials and/or omission of materials may be used to provide for added embodiments that are within the scope of the teachings herein.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for correcting offset drift of a sensor assembly used in cyclic sensing in an engine, wherein the engine has an engine control unit (ECU) in communication with the sensor assembly, which has a sensing element in communication with an application specific integrated circuit (ASIC), the method comprising:
    generating a cyclic signal indicative of a performance parameter of the engine, wherein the cyclic signal varies with an ambient engine parameter to create offset drift in the cyclic signal;
    identifying a target value for a parameter of the cyclic signal between sensing cycles of the sensor by the ASIC, wherein the signal is generated by the sensor assembly;
    ascertaining a difference between a measured value for the cyclic signal and the target value by the ASIC;
    ascertaining a duration between the sensing cycles by the ASIC;
    using the difference and the duration, calculating, by the ASIC, a number of steps to attain the target value from the measured value;
    adjusting, by the ASIC, the measured value by the number of steps to substantially agree with the target value and remove the offset drift to create an adjusted output signal; and
    utilizing the adjusted output signal, by the ECU, to control the engine during operation of the engine without compensation based on the ambient engine parameter for the sensor assembly.

2. The method as in claim 1, wherein the sensor comprises a pressure sensor and the ambient engine parameter is temperature.

3. The method as in claim 2, wherein the pressure sensor comprises a plurality of piezoresistive elements arranged in a Wheatstone bridge.

4. The method as in claim 1, wherein duration of a step is calculated as a duration of a cycle divided by a number of steps.

5. The method as in claim 4, wherein the duration of the step adjusted by using a feedback control loop.

6. The method as in claim 1, wherein the output comprises one of voltage, current, pulse width modulation (PWM/Frequency), LIN, SENT, I2C, and CAN-bus outputs.

7. The method as in claim 1, wherein ascertaining the duration comprises referencing the duration of the prior cycle.

8. The method as in claim 1, wherein the measured value indicates one of force, torque, positioning, speed, acceleration, chemical composition, temperature and flow.

9. A sensor and control system configured for use in cyclic sensing of a combustion engine, the sensor and control system comprising:
    an engine control unit (ECU) including an application specific integrated circuit (ASIC); and
    a pressure sensor in communication with the ECU including at least one piezoresistive element configured for sensing pressure and outputting a cyclic signal, wherein the cyclic signal varies with an ambient engine parameter to create offset drift in the cyclic signal, wherein the ECU is configured for receiving the cyclic signal of the piezoresistive element and identifying a target value for the cyclic signal for between sensing cycles of the sensor; ascertaining a difference between a measured value for the voltage and the target value; ascertaining a duration between the sensing cycles; using the difference and the duration, calculating a number of steps to attain the target value from the measured value; and, adjusting the cyclic signal by the number of steps to substantially agree with the target value so that the offset drift is removed; providing the adjusted cyclic signal as a corrected output of the sensor; and utilizing the adjusted cyclic signal to control the combustion engine during operation of the combustion engine without compensation based on the ambient engine parameter for the sensor assembly.

10. The sensor and control system as in claim 9, wherein the at least one piezoresistive element comprises an arrangement of piezoresistive elements in a Wheatstone bridge.

11. The sensor and control system as in claim 10, wherein the application specific integrated circuit (ASIC) is configurable for a time-out mode.

12. The sensor and control system as in claim 9, wherein size of the steps is obtained from data storage.

13. The sensor and control system as in claim 9, wherein the size of the steps is calculated as a function of cycle duration.

14. The sensor and control system as in claim 9, wherein the circuit is configured for being internally triggered by detection of an event.

15. The sensor and control system as in claim 9, wherein the circuit is configured for being externally triggered.

16. A sensor and control system for use in cyclic sensing of an engine, the sensor and control system comprising a sensor assembly including: an element configured for sensing a performance parameter of the engine and outputting a cyclic signal indicative of the performance parameter, wherein the cyclic signal varies with an ambient engine parameter to create offset drift in the cyclic signal; and a circuit coupled to the element, the circuit including an application specific integrated circuit (ASIC) with firmware; and an engine control unit in communication with the sensor assembly and operable to:

receive the cyclic signal during operation of the engine;

determine a baseline value of the cyclic signal, the baseline value being measured between at least two cycles;

store a target value of the cyclic signal for sensing cycles of the sensor;

ascertain a difference between the baseline value and the target value, wherein the difference includes the offset drift;

calculate a number of steps to adjust the cyclic signal in order to attain the target value with substantially linear behavior;

adjust the cyclic signal, during operation of the engine, according to the number of steps to create an output signal with the offset drift removed; and utilize the adjusted output signal to control the engine during operation of the engine without compensation based on the engine parameter for the sensor assembly.

17. A sensor and control system as recited in claim 16, wherein each step is small enough such that each step cannot be distinguished from a typical noise-level of the cyclic signal.

18. A sensor and control system as recited in claim 16, wherein the number of steps creates substantially linear behavior with a slope determined in an adaptive way.

* * * * *